(12) United States Patent
Tanino

(10) Patent No.: US 9,828,524 B2
(45) Date of Patent: Nov. 28, 2017

(54) ANTIFOULING COATING COMPOSITION, ANTIFOULING COATING FILM, ANTIFOULING SUBSTRATE, AND METHOD FOR IMPROVING STORAGE STABILITY OF ANTIFOULING COATING COMPOSITIONS

(71) Applicant: CHUGOKU MARINE PAINTS, LTD., Otake-shi (JP)

(72) Inventor: Soichiro Tanino, Otake (JP)

(73) Assignee: CHUGOKU MARINE PAINTS, LTD., Otake-shi (JP)

( * ) Notice: Subject to any disclaimer, the term of this patent is extended or adjusted under 35 U.S.C. 154(b) by 0 days.

(21) Appl. No.: 14/439,846

(22) PCT Filed: Nov. 8, 2013

(86) PCT No.: PCT/JP2013/080332
§ 371 (c)(1),
(2) Date: Apr. 30, 2015

(87) PCT Pub. No.: WO2014/077205
PCT Pub. Date: May 22, 2014

(65) Prior Publication Data
US 2015/0299515 A1    Oct. 22, 2015

(30) Foreign Application Priority Data

Nov. 13, 2012  (JP) .................. 2012-249242

(51) Int. Cl.
| | |
|---|---|
| *C08K 5/3432* | (2006.01) |
| *B63B 59/04* | (2006.01) |
| *C09D 183/06* | (2006.01) |
| *C09D 5/16* | (2006.01) |
| *C09D 7/12* | (2006.01) |
| *C09D 183/04* | (2006.01) |
| *C08K 5/00* | (2006.01) |
| *C08K 5/372* | (2006.01) |
| *C08G 77/16* | (2006.01) |

(52) U.S. Cl.
CPC .......... *C09D 183/06* (2013.01); *C08K 5/3432* (2013.01); *C09D 5/1675* (2013.01); *C09D 7/1233* (2013.01); *C09D 183/04* (2013.01); *C08G 77/16* (2013.01); *C08K 5/0058* (2013.01); *C08K 5/3725* (2013.01)

(58) Field of Classification Search
None
See application file for complete search history.

(56) References Cited

U.S. PATENT DOCUMENTS

| | | | | |
|---|---|---|---|---|
| 3,900,457 A | * | 8/1975 | Witt .................. | C01B 33/154 502/237 |
| 5,378,406 A | * | 1/1995 | Nagaoka ............. | C08K 5/0058 252/511 |
| 6,013,643 A | * | 1/2000 | Sakamoto ........... | C08K 5/0058 514/188 |
| 6,451,437 B1 | | 9/2002 | Amidaiji et al. | |
| 2002/0197490 A1 | * | 12/2002 | Amidaiji .................. | C08K 3/36 428/447 |
| 2005/0129962 A1 | | 6/2005 | Amidaiji et al. | |
| 2006/0137566 A1 | | 6/2006 | Yang et al. | |
| 2007/0219297 A1 | | 9/2007 | Nishiumi et al. | |
| 2009/0098384 A1 | | 4/2009 | Hata et al. | |
| 2011/0166280 A1 | * | 7/2011 | Davio .................... | C08L 83/04 524/447 |
| 2012/0264847 A1 | | 10/2012 | Thorlaksen et al. | |
| 2012/0277371 A1 | * | 11/2012 | Hagiwara ................. | C08J 3/24 524/588 |

FOREIGN PATENT DOCUMENTS

| | | |
|---|---|---|
| JP | 4-106156 A | 4/1992 |
| JP | 6-40821 A | 2/1994 |
| JP | 10-46033 A | 2/1998 |
| JP | 10-330618 A | 12/1998 |

(Continued)

OTHER PUBLICATIONS

Noll, Walter, Chemistry and Technology of Silicones, p. 253, Academic Press Inc, 1968.*
International Search Report dated Feb. 10, 2014, in PCT/JP2013/080332, filed Nov. 8, 2013.

*Primary Examiner* — Peter A Salamon
(74) *Attorney, Agent, or Firm* — Oblon, McClelland, Maier & Neustadt, L.L.P.

(57) ABSTRACT

In one aspect, the invention has an object of providing antifouling coating compositions which have high resistance to fouling, in particular, fouling by slime, can form coating films with excellent properties such as strength and rubber properties, exhibit appropriate viscosity (sprayability and coating film surface leveling properties during spray coating) and sagging resistance, and have high storage stability suppressing deteriorations of these properties. To achieve the object, the invention provides an antifouling coating composition including (A) a diorganopolysiloxane having at least two silanol groups in the molecule, (B) an organosilane and/or a partial hydrolyzate condensate thereof having at least two hydrolyzable groups in the molecule, and (C) a pyrithione metal salt. The antifouling coating composition can be prepared from a kit in the form of a multiple-component system including respective packages of a component including the component (A) and the component (C), and a component including the component (B). In the (kit for the preparation of the) antifouling coating composition, the pyrithione metal salt (C) functions as an effective ingredient for achieving excellent antifouling properties, in particular, anti-sliming properties, and also as an effective ingredient for improving storage stability.

16 Claims, No Drawings

(56) References Cited

FOREIGN PATENT DOCUMENTS

| | | |
|---|---|---|
| JP | 2001-139816 A | 5/2001 |
| JP | 2001-181509 A | 7/2001 |
| JP | 2002-53753 A | 2/2002 |
| JP | 2005-187599 A | 7/2005 |
| JP | 2006-503953 A | 2/2006 |
| JP | 2007-16096 A | 1/2007 |
| JP | 2007-211137 A | 8/2007 |
| JP | 2007-245141 A | 9/2007 |
| WO | WO 2011/076856 A1 | 6/2011 |

* cited by examiner

ANTIFOULING COATING COMPOSITION, ANTIFOULING COATING FILM, ANTIFOULING SUBSTRATE, AND METHOD FOR IMPROVING STORAGE STABILITY OF ANTIFOULING COATING COMPOSITIONS

TECHNICAL FIELD

The present invention relates to organopolysiloxane antifouling coating compositions, antifouling coating films formed therefrom, and antifouling substrates such as marine vessels and underwater structures coated with the antifouling coating films. The invention also relates to methods for improving the storage stability of organopolysiloxane antifouling coating compositions usually stored as multiple-component systems.

BACKGROUND ART

Antifouling coating films formed from curable organopolysiloxane antifouling coatings exhibit higher antifouling performance stably for a long term than conventional antifouling coating films produced from antifouling coatings based on hydrolyzable resins such as metal acrylate resins and silyl ester resins. The antifouling coating films formed from curable organopolysiloxane antifouling coatings have smaller elution of coating components into the sea, and are advantageous in terms of the prevention of environmental pollution.

Although antifouling coating films from curable organopolysiloxanes exhibit high antifouling performance in the sea against the attachment of macro organisms such as barnacles, bacterial secretions called slime become easily attached to the coating films. That is, these antifouling coating films have a drawback in that the resistance to fouling by slime (anti-sliming properties) is low.

Further, it is difficult for curable organopolysiloxane antifouling coatings to satisfy sprayability, coating film surface leveling properties and sagging resistance suited for spray operations with a good balance. Furthermore, difficulties are also encountered in designing curable organopolysiloxane antifouling coatings so that the coatings will maintain properties stably until they are used. In particular, the time available for the application to marine vessel shells is limited and therefore it is strongly demanded that thick films be formed in a small number of coating operations. However, a film thickness enough to ensure sufficient coating film strength and antifouling performance is difficult to realize with existing coatings in a small number of coating operations.

For example, Patent Literature 1 filed by the present applicant is directed to providing a cured organopolysiloxane antifouling composite coating film which is obtained by stacking, directly on the surface of an epoxy resin anticorrosive coating film, an organopolysiloxane antifouling coating film excellent in the interlayer adhesion with respect to the anticorrosive coating film as well as in antifouling performance. The cured organopolysiloxane antifouling composite coating film proposed for the direction includes:

[I] an epoxy resin anticorrosive coating film formed from an anticorrosive coating composition [i] comprising an epoxy resin (e1) and an amine-based, epoxy resin-curing agent (e2); and

[II] an antifouling coating film stacked directly on the surface of the epoxy resin anticorrosive coating film and formed from an antifouling coating composition [ii] comprising a curable organopolysiloxane composition, wherein the curable organopolysiloxane composition is a three-component curable organopolysiloxane composition comprised of (A) a main agent component containing an organopolysiloxane (a1) having at least two condensation reactive groups in the molecule, and silica (a2);

(B) a curing agent component containing an organosilane and/or a partial hydrolyzate thereof (b1) having functional groups capable of condensation reaction with the condensation reactive groups in the organopolysiloxane (a1); and (C) a curing accelerator component containing a specific tin compound (ac).

Because of the direct coating on the epoxy resin anticorrosive coating film, the cured organopolysiloxane antifouling composite coating film of Patent Literature 1 can be completed in a short work period and exhibits excellent antifouling properties. However, the sagging resistance of the coating film is deteriorated during long storage and this makes it difficult to apply the coating in a large thickness. Further, although the formed coating film exhibits excellent antifouling properties and shows high effects in the prevention of macro fouling by organisms such as barnacles and Schizoporellidae, the attachment of slime takes place gradually.

Patent Literature 2 is directed to providing an anti-algae condensation curable organopolysiloxane composition displaying durable anti-algae performance and exhibiting excellent workability and water resistance, as well as to providing a coating method using the composition and a structure coated with the composition. The anti-algae condensation curable organopolysiloxane composition proposed for the direction is obtained by blending:

(A) a base polymer, in detail, an organopolysiloxane block copolymer which has at least two hydroxyl groups and/or hydrolyzable groups bonded to silicon atoms in the molecule, contains siloxane blocks represented by Formula (2): $(R^1{}_2SiO_{2/2})_x$ (wherein $R^1$ is an optionally substituted monovalent hydrocarbon group of 1 to 10 carbon atoms having no aliphatic unsaturated groups, and the letter x is an integer of 3 to 150), contains 30 to 80 mass % siloxane blocks represented by Average Unit Formula (3): $R^2SiO_{3/2}$ (wherein $R^2$ is an optionally substituted aryl or alkaryl group of 6 to 12 carbon atoms) and having 3 to 150 silicon atoms, and has molecular ends at least partially terminated with units represented by Formula (4): $R^3R^4{}_2SiO_{1/2}$ (wherein $R^3$ is a hydroxyl group or a hydrolyzable group, and $R^4$ indicates an optionally substituted monovalent hydrocarbon group of 1 to 10 carbon atoms having no aliphatic unsaturated groups);

(B) a silane and/or a partial hydrolyzate condensate thereof having two or more hydrolyzable groups in the molecule; and (C) a specific urea compound (an anti-algae agent).

Although Patent Literature 2 describes that the coating film prevents the growth of algae, it is a drawback of the coating film that the resistance to the attachment of slime in seawater is not satisfactory. Marine vessels coated with such a coating film become fouled by slime, which deteriorates the functions of marine vessels and thus incurs frequent cleaning.

Patent Literature 3 is directed to providing an antifungal organopolysiloxane composition which can be cured to form silicone rubber with excellent weather resistance by occurrence of deoximation reaction. The organopolysiloxane composition proposed for the direction includes:

(A) 100 parts by weight of a silanol group-containing organopolysiloxane represented by General Formula (1):

HO[Si($R^1$)$_2$O]$_n$H (wherein $R^1$ indicates an optionally substituted monovalent hydrocarbon group, the plurality of $R^1$s may be the same or different from one another, and the letter n is an integer of 10 or greater) and having a viscosity at 25° C. in the range of 25 to 500,000 cSt;

(B) 0.1 to 30 parts by weight of a hydrolyzable organosilane represented by General Formula (2): ($R^2$)$_a$Si[ON=C($R^1$)$_2$]$_{4-a}$ (2) (wherein $R^1$ is the same as defined above, $R^2$ indicates a monovalent aliphatic hydrocarbon group, and the letter a is 0 or 1) and/or a partial hydrolyzate thereof;

(C) 0.1 to 5 parts by weight of a triazolyl group-containing antifungal compound; and (D) 3 to 100 parts by weight of an organopolysiloxane represented by General Formula (3): ($R^7$)$_3$SiO[Si($R^1$)$_2$O]$_m$Si($R^7$)$_3$ (3) (wherein $R^1$ is the same as defined above, $R^7$ is similar to $R^1$, and the letter m is an integer of 0 or greater) and having a viscosity at 25° C. that is 1/200 to 2 times greater than that of the component (A).

Although Patent Literature 3 describes that the coating film prevents the growth of algae, it is a drawback of the coating film that the resistance to the attachment of slime in seawater is not satisfactory. Marine vessels coated with such a coating film will lower functions as marine vessels due to the development of fouling by slime, thus requiring frequent cleaning.

Patent Literature 4 filed by the present applicant is directed to providing a curable composition which is excellent in properties such as low viscosity and high thixotropy with a good balance, can be applied in a large thickness in one coating operation, and can give a cured coating film exhibiting excellent properties such as rubber strength and surface smoothness with a good balance. The curable composition proposed for the direction, which can be used as an antifouling coating composition, contains: (A) an organopolysiloxane having condensation reactive functional groups at both ends of the molecule; and (B) hydrophobic silica, wherein the hydrophobic silica (B) has been heat treated together with the organopolysiloxane (A).

Although the curable composition (antifouling coating composition) of Patent Literature 4 can give coating films with a uniform film thickness and excellent long-term antifouling performance, it is difficult for the composition to form coating films having a film thickness required to protect marine vessel shells in one coating operation without the occurrence of sagging. Further, the coating films have a drawback in that the coating films are easily scratched by contact with objects floating on the sea.

Patent Literature 5 filed by the present applicant is directed to providing a curable composition which is excellent in properties such as low viscosity and high thixotropy with a good balance, can be applied in a large thickness in one coating operation, and can give a cured coating film exhibiting excellent properties such as rubber strength and surface smoothness with a good balance. The curable composition proposed for the direction, which can be used as an antifouling coating composition, is produced by heat treating part or the whole of an organopolysiloxane (A) terminated with hydroxyl groups or hydrolyzable groups at both ends of the molecule, together with at least one of hydrophobic silica and hydrophilic silica (B) at a temperature of from 100° C. to the decomposition temperature of the components, and thereafter, if there is any remaining portion, adding at least the remaining portion of the component (A) and the component (B) to the resultant heat treated product.

However, similarly to the composition of Patent Literature 4, it is difficult for the curable composition (antifouling coating composition) of Patent Literature 5 to form coating films having a film thickness required to protect marine vessel shells in one coating operation without the occurrence of sagging. Further, the coating films have a drawback in that the coating films are easily scratched by contact with objects floating on the sea.

Patent Literature 6 discloses a fouling control coating composition comprising a polysiloxane-based binder system, 0.01 to 20% by dry weight of one or more hydrophilic-modified polysiloxanes, and one or more biocides. For example, the hydrophilic-modified polysiloxane is a polysiloxane having incorporated in and/or grafted to the backbone thereof a poly(oxyalkylene)-modified polysiloxane.

The coating composition of Patent Literature 6 is characterized in that the composition exhibits antifouling performance by the hydrophilic-modified polysiloxane facilitating the leaching of the biocides. However, the hydrophilic-modified polysiloxane has low compatibility with the polysiloxane that is the base resin in the coating composition. Because of this low compatibility, coating films formed from the coating composition tend to have problems in that the adhesion with respect to surfaces and the uniformity in coating film appearance are variable depending on the conditions in which the coating composition is applied.

CITATION LIST

Patent literature

Patent Literature 1: JP-A-2007-245141 (Japanese Patent No. 5189773)

Patent Literature 2: JP-A-2007-211137 (Japanese Patent No. 4711072)

Patent Literature 3: JP-A-H10-46033 (Japanese Patent No. 3407268)

Patent Literature 4: JP-A-2001-139816 (Japanese Patent No. 4195537)

Patent Literature 5: JP-A-2001-181509 (Japanese Patent No. 4519289)

Patent Literature 6: WO 2011/76856 (JP-A-2013-515122)

SUMMARY OF INVENTION

Technical Problem

The present invention has been made in order to solve the problems described above. It is therefore an object of the invention to provide antifouling coating compositions which have high resistance to fouling by slime (anti-sliming properties), can form coating films with excellent properties such as strength and rubber properties, exhibit appropriate viscosity (sprayability and coating film surface leveling properties during spray coating) and sagging resistance, and have high storage stability suppressing deteriorations of these properties. In another aspect of the invention, an object of the invention is to provide antifouling coating films exhibiting excellent resistance to fouling, in particular, fouling by slime, and having excellent properties such as strength, rubber properties and surface leveling properties, as well as to provide antifouling substrates having the surface coated with such antifouling coating films. In a further aspect of the invention, the invention has an object of providing methods for improving the storage stability of organopolysiloxane antifouling coating compositions stored as multiple-component kits.

Solution To Problem

The present inventor studied extensively the configurations of antifouling coatings capable of solving the above problems. In the studies, the present inventor has found that the addition of a pyrithione metal salt to a component which includes an organopolysiloxane generally called the "main component" in a multiple-component organopolysiloxane antifouling coating composition results in an antifouling coating composition which exhibits markedly improved resistance to fouling by slime, maintains an appropriate coating film-forming capability while suppressing deteriorations in properties such as sagging resistance and viscosity during storage of the coating, and potentially shows improvements in these properties compared to prior to the storage. The present invention has been completed based on the finding.

An antifouling coating composition according to the present invention for solving the above problems includes: (A) a diorganopolysiloxane having at least two silanol groups in the molecule; (B) an organosilane and/or a partial hydrolyzate condensate thereof having at least two hydrolyzable groups in the molecule; and (C) a pyrithione metal salt.

The diorganopolysiloxane (A) is preferably represented by General Formula [I]:

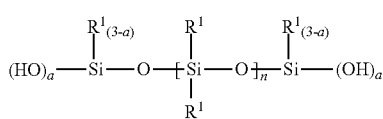

[I]

(wherein $R^1$ indicates independently at each occurrence a hydrocarbon group of 1 to 6 carbon atoms, the letter a is an integer of 1 to 3, and the letter n is an integer of 5 to 1,000).

The organosilane and/or the partial hydrolyzate condensate thereof (B) is preferably represented by General Formula [II]:

[II]

(wherein $R^2$ indicates independently at each occurrence a hydrocarbon group of 1 to 6 carbon atoms, Y indicates independently at each occurrence a hydrolyzable group, and the letter d is an integer of 0 to 2).

The pyrithione metal salt (C) is preferably represented by General Formula [III]:

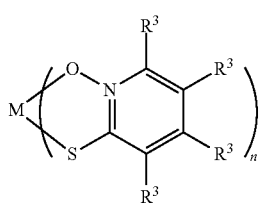

[III]

(wherein $R^3$ indicates independently at each occurrence a hydrogen atom or an alkyl, cycloalkyl, alkenyl, aryl, alkoxy or halogenated alkyl group of 1 to 6 carbon atoms, M indicates a metal Zn, Cu, Na, Mg, Ca, Ba, Fe or Sr, and the letter n is the valence of the metal M).

The diorganopolysiloxane (A) preferably has a weight average molecular weight of 500 to 1,000,000.

Preferably, part or the whole of the diorganopolysiloxane (A) has been heat treated with silica beforehand.

The organosilane and/or the partial hydrolyzate condensate thereof (B) preferably has at least one of oxime groups, acetyloxy groups and alkoxy groups as the hydrolyzable groups.

The antifouling coating composition preferably further includes a curing catalyst (G).

A kit for the preparation of the antifouling coating composition according to the present invention is a multiple-component system including respective packages of a component including the diorganopolysiloxane (A) and the pyrithione metal salt (C), and a component including the organosilane and/or the partial hydrolyzate condensate thereof (B). The antifouling coating composition may be prepared by mixing the contents in the components of the kit.

An antifouling coating film according to the present invention is obtained by curing the aforementioned antifouling coating composition.

An antifouling substrate according to the present invention is obtained by coating or impregnating a substrate with the aforementioned antifouling coating composition, and thereafter curing the composition. The substrate is preferably an underwater structure or a marine vessel.

A method for manufacturing antifouling substrates according to the present invention includes a step of coating or impregnating a substrate with the aforementioned antifouling coating composition, and a step of curing the composition that has been applied to coat or impregnate the substrate.

In order to solve the problem according to the other aspect of the invention, the invention provides a method for improving the storage stability of an antifouling coating composition, the antifouling coating composition being in the form of a kit for the preparation of the antifouling coating composition, the kit being a multiple-component system including respective packages of a component including a diorganopolysiloxane (A) having at least two silanol groups in the molecule, and a component including an organosilane and/or a partial hydrolyzate condensate thereof (B) having at least two hydrolyzable groups in the molecule, the method being characterized in that a pyrithione metal salt (C) is added to the component including the diorganopolysiloxane (A). In other words, the further aspect of the invention provides a method of using a pyrithione metal salt (C), or the use of a pyrithione metal salt (C), as an effective ingredient for improving the storage stability of the kit for the preparation of an antifouling coating composition by the addition of the pyrithione metal salt (C) to the component including the diorganopolysiloxane (A).

Advantageous Effects Of Invention

The antifouling coating compositions of the invention have low viscosity to exhibit excellent sprayability and coating film surface leveling properties during spray coating, and at the same time have high sagging resistance. Thus, the inventive antifouling coating compositions can form thick coating films in one coating operation, thereby allowing work periods to be shortened. Further, these properties are not deteriorated in contrast to the conventional organopolysiloxane coating compositions whose properties are easily altered due to changes in quality during storage. Not only the properties are maintained, improvements in the properties are obtained according to some embodiments of the invention. In the invention, the effects of suppressing deteriorations in the above properties, namely, the effects in any of the maintenance and the improvement of the above properties are included in the effects of improving the storage stability.

Although the conventional organopolysiloxane antifouling coatings exhibit excellent effects in the prevention of macro fouling by organisms such as barnacles and Schizoporellidae, they cannot prevent the attachment of slime which is a bacterial secretion. This critical problem is solved by coating films formed from the inventive coating compositions. That is, the coating films can protect substrates such as underwater structures or marine vessel shells coated therewith from the attachment of various marine organisms and allow the substrates to display their normal functions for long periods. Further, the resultant coating films exhibit excellent properties such as coating film strength and rubber properties.

DESCRIPTION OF EMBODIMENTS

Hereinbelow, the present invention will be described in detail with respect to aspects such as antifouling coating compositions, antifouling coating films, antifouling substrates and methods for improving the storage stability of antifouling coating compositions. The present invention is not limited to embodiments described below, and various modifications are possible within the scope and spirit of the invention.

—Antifouling Coating Compositions—

An antifouling coating composition according to the present invention includes a diorganopolysiloxane (A) having at least two silanol groups (≡Si—OH) in the molecule, an organosilane and/or a partial hydrolyzate condensate thereof (B) having at least two hydrolyzable groups in the molecule, and a pyrithione metal salt (C). These components will be described sequentially below.

(A) Diorganopolysiloxanes

The diorganopolysiloxane (A) has at least two silanol groups in the molecule. In detail, compounds represented by General Formula [I] below are preferable.

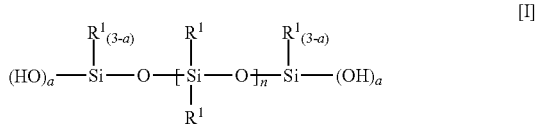

[I]

In General Formula [I], $R^1$ indicates independently at each occurrence a hydrocarbon group of 1 to 6 carbon atoms, for example, a linear or branched alkyl group such as methyl, ethyl or propyl group, or a cycloalkyl group such as cyclohexyl group, and is preferably a methyl group.

The letter a is an integer of 1 to 3, and is preferably 1. The letter n is an integer of 5 or greater, and is preferably 100 to 1,000.

The diorganopolysiloxane (A) preferably has a weight average molecular weight of 5 to 1,000,000, more preferably 5,000 to 100,000, and still more preferably 10,000 to 50,000. Further, the viscosity thereof at 23° C. is preferably 20 to 100,000 mPa·s, more preferably 100 to 10,000 mPa·s, and still more preferably 500 to 5,000 mPa·s. These weight average molecular weight and viscosity values advantageously ensure that the coating exhibits excellent workability during production, sprayability and curability into coating films as well as that the resultant coating films show high strength.

In the antifouling coating composition which may include a solvent, the diorganopolysiloxane (A) is usually present in 20 to 90 wt %, and preferably 50 to 70 wt %. Further, the content of the diorganopolysiloxane (A) with respect to 100 wt % of the solid content of the antifouling coating composition is usually 30 to 95 wt %, and preferably 60 to 90 wt %. Such a content ensures that coating films with good coating film strength and rubber elasticity can be formed as well as that the resultant antifouling coating films will exhibit antifouling properties for long periods.

Commercially available products may be used as the diorganopolysiloxanes (A). Examples thereof include "DMS-S35" (manufactured by GELEST, Inc.).

(Silica)

The antifouling coating composition of the invention may contain silica together with the diorganopolysiloxane (A). In this case, the silica may be kneaded together with the diorganopolysiloxane (A) before use, in particular, during the preparation of a component including the diorganopolysiloxane (a main component) of a multiple-component antifouling coating composition.

Examples of the silica for use in the invention include hydrophilic silica (non-surface-treated silica) such as wet process silica (hydrated silica) and dry process silica (fumed silica and anhydrous silica), and surface-treated hydrophobic silica such as hydrophobic wet silica and hydrophobic fumed silica. These types of silica may be used singly or as a mixture.

The wet process silica is not particularly limited. For example, that having an adsorbed water content of about 4 to 8%, a bulk density of 200 to 300 g/L, a primary particle diameter of 10 to 30 μm and a specific surface area (a BET surface area) of not less than 10 m²/g may be used.

The dry process silica is not particularly limited. For example, that having a water content of not more than 1.5%, a bulk density of 50 to 100 g/L, a primary particle diameter of 8 to 20 μm and a specific surface area of not less than 10 m²/g may be used.

The hydrophobic fumed silica is obtained by surface-treating the dry process silica with organosilicon compounds such as methyltrichlorosilane, dimethyldichlorosilane, hexamethyldisilazane, hexamethylcyclotrisiloxane and octamethylcyclotetrasiloxane. The hydrophobic fumed silica absorbs little water over time, and the water content is usually not more than 0.3%, and most often 0.1 to 0.2%. The hydrophobic fumed silica is not particularly limited. For example, that having a primary particle diameter of 5 to 50 μm, a bulk density of 50 to 100 g/L, and a specific surface area of not less than 10 m²/g may be used.

When the silica is heat treated together with the diorganopolysiloxane as will be described later, water adsorbed on the surface of the silica is physically reduced or removed. As a result, the water content of the heat-treated hydrophobic fumed silica is usually not more than 0.2%, preferably not more than 0.1%, and more preferably 0.05 to 0.1%. Other properties such as the bulk density remain the same as in the hydrophobic silica prior to the heat treatment.

Commercially available products may be used as the silica. Examples thereof include "R974" and "RX200" manufactured by Nippon Aerosil Co., Ltd.

When an antifouling coating composition is produced which contains the silica together with the diorganopolysiloxane, in particular, when a multiple-component antifouling coating composition is produced which includes a component (a main component) containing the diorganopolysiloxane kneaded together with the silica, the diorganopolysiloxane and the silica are preferably used as a heat-treated product formed by heat treating these components in advance, or as a mixture of the heat-treated product with the raw diorganopolysiloxane. Such a configuration is preferable because the preliminary heat treatment of the silica together with part or the whole of the diorganopolysiloxane enhances the affinity between the two components and produces effects such as suppressed aggregation of the silica. For example, the heat treatment may be carried out by heating the components at normal or reduced pressure and a temperature of from 100° C. to the decomposition temperature of the components, preferably a temperature of 100 to 300° C., and more preferably 140 to 200° C., usually for about 3 to 30 hours.

The silica is usually added in a proportion of 1 to 100 wt %, preferably 2 to 50 wt %, and more preferably 5 to 30 wt % relative to the diorganopolysiloxane (A). If the amount of the silica added is less than this range, sufficient coating film strength, coating film hardness and thixotropy cannot be obtained and the coating may fail to achieve a desired film thickness in one coating operation, in particular one spray coating operation. Any amount exceeding the above range may result in an excessively high viscosity of the coating.

The above use of silica produces effects such as that the stability during preparation or storage of the obtainable antifouling coating composition is increased, that the coating exhibits good flowability and thixotropy and can form coating films with a sufficient thickness in a small number of coating operations even on vertical surfaces, and further that the obtainable coating films are excellent and well balanced in terms of such properties as hardness, tensile strength and elongation.

(B) Organosilanes and/or Partial Hydrolyzate Condensates thereof

Preferably, the organosilane and/or the partial hydrolyzate condensate thereof (B) is a compound and/or a partial hydrolyzate condensate thereof represented by General Formula [II] below.

$$R^2{}_d SiY_{4-d} \qquad [II]$$

In General Formula [II], $R^2$ indicates independently at each occurrence a hydrocarbon group of 1 to 6 carbon atoms, for example, a linear or branched alkyl group such as methyl, ethyl or propyl group, a cycloalkyl group such as cyclohexyl group, an alkenyl group such as vinyl group, or an aryl group such as phenyl group, and is preferably a methyl group or an ethyl group.

In General Formula [II], Y indicates independently at each occurrence a hydrolyzable group. Examples thereof include oxime groups, acetyloxy groups, alkoxy groups, acyloxy groups, alkenyloxy groups, iminoxy groups, amino groups, amide groups and aminoxy groups, with alkoxy groups being preferable.

Preferred oxime groups are those having a total of 1 to 10 carbon atoms. Examples include dimethyl ketoxime, methyl ethyl ketoxime, diethyl ketoxime and methyl isopropyl ketoxime.

Preferred acetyloxy groups are aliphatic such groups having a total of 1 to 10 carbon atoms as well as aromatic such groups having a total of 6 to 12 carbon atoms. Examples include acetoxy group, propyloxy group, butyloxy group and benzoyloxy group.

Preferred alkoxy groups are those having a total of 1 to 10 carbon atoms. An oxygen atom may be present between at least one pair of adjacent carbon atoms. Examples include methoxy group, ethoxy group, propoxy group, butoxy group, methoxyethoxy group and ethoxyethoxy group.

Preferred acyloxy groups are aliphatic or aromatic such groups represented by the formula: RCOO— (wherein R is an alkyl group of 1 to 10 carbon atoms or an aromatic group of 6 to 12 carbon atoms). Examples thereof include acetoxy group, propionoxy group, butyloxy group and benzoyloxy group.

Preferred alkenyloxy groups are those having 3 to 10 carbon atoms. Examples thereof include isopropenyloxy group, isobutenyloxy group and 1-ethyl-2-methylvinyloxy group.

Preferred iminoxy groups (=N—OH, also referred to as oxyimino groups or ketoxime groups) are those having about 3 to 10 carbon atoms. Examples thereof include ketoxime group, dimethyl ketoxime group, methyl ethyl ketoxime group, diethyl ketoxime group, cyclopentanoxime group and cyclohexanoxime group.

Preferred amino groups are those having 1 to 10 carbon atoms. Examples thereof include N-methylamino group, N-ethylamino group, N-propylamino group, N-butylamino group, N,N-dimethylamino group, N,N-diethylamino group and cyclohexylamino group.

Preferred amide groups are those having a total of 2 to 10 carbon atoms. Examples thereof include N-methylacetamide group, N-ethylacetamide group and N-methylbenzamide group.

Preferred aminoxy groups are those having a total of 2 to 10 carbon atoms. Examples thereof include N,N-dimethylaminoxy group and N,N-diethylaminoxy group.

The letter d is an integer of 0 to 2, and is preferably 0.

Commercially available organosilanes may be used. Exemplary tetraethyl orthosilicates include "ETHYL SILICATE 28" (manufactured by COLCOAT CO., LTD.) and "ETHYL ORTHOSILICATE" (manufactured by Tama Chemicals Co., Ltd.). Exemplary partial hydrolyzate condensates of tetraethyl orthosilicates include "SILICATE 40" (manufactured by Tama Chemicals Co., Ltd.) and "TES40 WN" (manufactured by Wacker Asahikasei Silicone Co., Ltd.). Exemplary alkyl trialkoxysilanes include "KBM-13" (manufactured by Shin-Etsu Chemical Co., Ltd.).

In the antifouling coating composition which may include a solvent, the organosilane and/or the partial hydrolyzate condensate thereof (B) having at least two hydrolyzable groups described above in the molecule may be present in 0.1 to 50 wt %, and is usually present in 1 to 30 wt %, and preferably 3 to 15 wt %. This content ensures that the coating composition maintains an appropriate curing rate and is cured to give coating films exhibiting excellent coating film strength and rubber properties.

(C) Pyrithione Metal Salts

Preferably, the pyrithione metal salt (C) is a compound or a mixture of two or more compounds selected from compounds represented by General Formula [III] below.

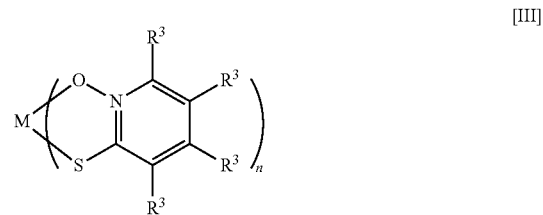

In General Formula [III], $R^3$ indicates independently at each occurrence a hydrogen atom; an alkyl group of 1 to 6 carbon atoms, for example, a linear or branched alkyl group such as methyl, ethyl or propyl group; a cycloalkyl group such as cyclohexyl group; an alkenyl group such as vinyl group; an aryl group such as phenyl group; an alkoxy group of 1 to 6 carbon atoms, for example, a methoxy, ethoxy or propoxy group; or a halogenated alkyl group of 1 to 6 carbon atoms, for example, a trifluoromethyl group; and preferably indicates a hydrogen atom.

M indicates a metal Zn, Cu, Na, Mg, Ca, Ba, Fe or Sr, and is preferably Zn or Cu. The letter n is the valence of the metal M, and is preferably 2.

In the antifouling coating composition which may include a solvent, the pyrithione metal salt (C) may be present in .1 to 50 wt %, and is usually present in 1 to 30 wt %, preferably 3 to 20 wt %, and more preferably 5 to 15 wt %. Further, the pyrithione metal salt (C) is usually present in a dry coating film at 1 to 40 wt %, and preferably 3 to 25 wt %. The pyrithione metal salt (C) is usually used in 1 to 80 wt %, and preferably 8 to 30 wt % relative to the diorganopolysiloxane (A). Further, the pyrithione metal salt (C) is usually used in 30 to 100,000 wt %, preferably 150 to 10,000 wt %, and more preferably 600 to 5,000 wt % relative to an ether-modified organopolysiloxane which is a typical anti-sagging and anti-settling agent.

In the antifouling coating composition of the invention, the pyrithione metal salt (C) functions as an effective ingredient for achieving excellent antifouling properties, in particular, anti-sliming properties, and also as an effective ingredient for improving storage stability.

The reason why the addition of the pyrithione metal salt (C) provides the above characteristics is probably because the terminal hydroxyl groups of the diorganopolysiloxane (A) interact with the metal center of the pyrithione metal salt (C) which easily gives vacant coordination sites. This interaction allows the pyrithione metal salt to be eluted from the inside of the antifouling coating film at a suitable rate, thus markedly reducing the attachment of slime over a long period. Further, the interaction suppresses the occurrence of chemical reactions that may change properties of the coating during storage, with the result that an appropriate coating film-forming capability is maintained until the preparation of the antifouling coating composition or the coating film-forming capability is ameliorated during the storage. In detail, the phrase that an appropriate coating film-forming capability is maintained indicates that the coating remains at substantially the same level before and after storage in terms of the capability in which the coating shows low viscosity and good sprayability as well as can be applied in a large thickness by exhibiting good sagging resistance. The phrase that the coating film-forming capability is ameliorated means that the viscosity is reduced to allow for improved sprayability and/or the sagging resistance is improved to allow for thicker application. An increase in viscosity does not cause problems in the application as long as the increase does not adversely affect sprayability and sagging resistance (thick applicability).

(Optional Ingredients)

In addition to the diorganopolysiloxane (A), the organosilane and/or the partial hydrolyzate condensate thereof (B) having at least two hydrolyzable groups in the molecule, and the pyrithione metal salt (C), the antifouling coating composition according to the present invention may contain other ingredients such as silicone oils (D), fillers (E), anti-sagging and anti-settling agents (F), curing catalysts (G), silane coupling agents (H), antifouling agents (I) other than the components (C), additional coating film-forming components (J), inorganic dehydrating agents (K), flame retardants (L), thixotropic agents (M) and thermal conductivity improvers (N).

(D) Silicone Oils

Preferred silicone oils (D) are those which can bleed out from cured products of the antifouling coating. Examples of such silicone oils (D) include phenyl-modified organopolysiloxanes represented by Formula [IV] below.

$(R^4)_3SiO(SiR^4_2O)_nSi(R^4)_3$        [IV]

In Formula [IV], $R^4$ indicates independently at each occurrence an alkyl, aryl, aralkyl or fluoroalkyl group of 1 to 10 carbon atoms, at least one of $R^4$s is a phenyl group, and the letter n indicates an integer of 0 to 150.

Of the silicone oils (D), those silicone oils represented by Formula [IV] usually have a weight average molecular weight of 180 to 20,000, preferably 1,000 to 10,000, and usually have a viscosity at 23° C. of 20 to 30,000 mPa·s, preferably 50 to 3,000 mPa·s.

Of the silicone oils represented by Formula [IV], for example, methyl phenyl silicone oils are preferable that are derived from dimethyl silicone oils in which $R^4$s are all methyl groups by the substitution (modification) of part of the methyl groups with phenyl groups.

Examples of the methyl phenyl silicone oils include products sold under the trade names of "KF-54", "KF-56" and "KF-50" (manufactured by Shin-Etsu Chemical Co., Ltd.), "SH510" and "SH550" (manufactured by Dow Corning Toray Co., Ltd.) and "TSF431" (manufactured by Toshiba Silicone).

In the antifouling coating composition which may include a solvent, the silicone oils (D) are preferably present in a total content of 0.1 to 50 wt %, and more preferably 3 to 20 wt %. This content of the silicone oils (D) ensures that the obtainable antifouling coating can form antifouling coating films with excellent antifouling properties and coating film strength which tend to function as satisfactory antifouling layers. If the content is below the above range, antifouling properties may be deteriorated. Any content exceeding the above range may result in a decrease in coating film strength.

(E) Fillers

The fillers (E) may be known organic and inorganic pigments and other types of fillers. Examples of the organic pigments include carbon black, phthalocyanine blue and iron blue. Examples of the inorganic pigments include neutral and nonreactive pigments such as titanium white (titanium oxide), red oxide, barite powder, silica, talc, white chalk and iron oxide powder; and basic pigments reactive with acidic substances in the coating (active pigments) such as Chinese white (ZnO, zinc oxide), lead white, red lead, zinc powder and lead suboxide powder. Examples of other types of fillers include metal oxides such as diatomaceous earth and alumina; metal carbonate salts such as calcium carbonate, magnesium carbonate and zinc carbonate; and others such as asbestos, glass fibers, quartz powder, aluminum hydroxide, gold powder, silver powder, surface-treated calcium carbonate and glass balloon. These fillers may be surface treated with silane compounds. The fillers may be used singly, or two or more may be used in combination. Further, the fillers may include colorants such as dyes.

The addition of the fillers (E) can improve the strength of the coating films. Further, the coating which contains the fillers can conceal a primer coating film to prevent UV degradation of the primer coating film. In the antifouling coating composition which may include a solvent, the fillers (E) may be preferably present in 0.1 to 30 wt %.

(F) Anti-sagging and Anti-settling Agents (Thickening Agents)

Examples of the anti-sagging and anti-settling agents (thickening agents) (F) include ether-modified organopolysiloxanes, organic clay waxes (such as stearate salts, lecithin salts and alkylsulfonate salts of Al, Ca and Zn), organic waxes (such as polyethylene waxes, polyethylene oxide waxes, amide waxes, polyamide waxes and hydrogenated castor oil waxes), mixtures of organic clay waxes and organic waxes, and synthetic fine powdery silica. Of these, ether-modified organopolysiloxanes and synthetic fine powdery silica are preferable.

Of the components (F), compounds represented by Formula [V] below may be used as the ether-modified organopolysiloxanes.

$(R^5)_3SiO(SiR^5{}_2O)_nSi(R^5)_3$      [V]

In Formula [V], $R^5$ indicates independently at each occurrence a hydrogen atom; an alkyl, aryl or aralkyl group of 1 to 10 carbon atoms; a hydroxyl group; a hydrolyzable group Y; or a linear, branched or alicyclic hydrocarbon chain with an ether group optionally terminated with a hydroxyl group, a —$SiR_xY_{(3-x)}$ group (x is 0 to 2) or an alkyl or acyl group of 1 to 6 carbon atoms. At least one of $R^5$s is a linear, branched or alicyclic hydrocarbon chain with an ether group optionally terminated with a hydroxyl group, a —$SiR_xY_{(3-x)}$ group (x is 0 to 2) or an alkyl or acyl group of 1 to 6 carbon atoms. The hydrolyzable group Y is the same as defined in Formula [II]. The letter n indicates an integer of 1 or greater.

Examples of the ether-modified organopolysiloxanes include products such as "FZ-2191" (alkylene glycol-modified silicone oil, Dow Corning Toray Co., Ltd.), "FZ-2101" (alkylene glycol-modified silicone oil, Dow Corning Toray Co., Ltd.), "X-22-4272" (hydroxyl-terminated/alkylene glycol-modified silicone oil, Shin-Etsu Chemical Co., Ltd.), and "BY16-839" (alicyclic epoxy-modified silicone oil, Dow Corning Toray Co., Ltd.).

Of the ether-modified organopolysiloxanes, those having a viscosity at 23° C. of 100 to 10,000 mPa·s are usually used.

Of the components (F), the polyamide waxes maybe products sold by Kusumoto Chemicals, Ltd. under the trade names of "DISPARLON 305", "DISPARLON 4200-20" and "DISPARLON A630-20X".

The addition of the anti-sagging and anti-settling agents (F) can improve the sagging resistance of the coating films. However, adding these components in an excessively large amount can result in decreases in terms of adhesion, sprayability of the coating and leveling properties of the coating films. Thus, the amount of the anti-sagging and anti-settling agents (F), in particular, the representative ether-modified organopolysiloxanes of Formula [V], is usually 0.01 to 10 wt %, and preferably 0.1 to 3 wt % in the antifouling coating composition which may include a solvent. Further, the content of such components in a dry coating film is usually 0.01 to 10 wt %, and preferably 0.1 to 3 wt %.

(G) Curing Catalysts

The curing catalysts (G) may be used to accelerate the curing reaction between the diorganopolysiloxane (A) and the organosilane and/or the partial hydrolyzate condensate thereof (B). Suitable examples of such curing catalysts (G) include those described in JP-A-H04-106156 (Japanese Patent No. 2522854). Specific examples include tin carboxylates such as tin naphthenate and tin oleate; tin compounds such as dibutyltin diacetate, dibutyltin acetoacetonate, dibutyltin dioctoate, dibutyltin dilaurate, dibutyltin dioleate, dibutyltin oxide, dibutyltin dimethoxide, dibutyltin dipentoate, dibutyltin dineodecanoate, dioctyltin dineodecanoate, bis(dibutyltin laurate)oxide, dibutyl bis(triethoxysiloxy)tin, bis(dibutyltin acetate)oxide, dibutyltin bis(ethyl maleate) and dioctyltin bis(ethyl maleate); titanate esters or titanium chelate compounds such as tetraisopropoxytitanium, tetra-n-butoxytitanium, tetrakis(2-ethylhexoxy)titanium, dipropoxybis(acetylacetonato)titanium and titanium isopropoxyoctyl glycol; organometallic compounds such as zinc naphthenate, zinc stearate, zinc 2-ethyloctoate, iron 2-ethylhexoate, cobalt 2-ethylhexoate, manganese 2-ethylhexoate, cobalt naphthenate and alkoxyaluminum compounds; aminoalkyl-substituted alkoxysilanes such as 3-aminopropyltrimethoxysilane and N-β-(aminoethyl)γ-aminopropyl trimethoxysilane; amine compounds and salts thereof such as hexylamine, dodecyldodecylamine phosphate, dimethylhydroxylamine and diethylhydroxylamine; quaternary ammonium salts such as benzyltriethyl ammonium acetate; lower fatty acid salts of alkali metals such as potassium acetate, sodium acetate and lithium oxalate; and guanidyl group-containing silanes or siloxanes such as tetramethylguanidylpropyltrimethoxysilane, tetramethylguanidylpropylmethyldimethoxysilane and tetramethylguanidylpropyltris(trimethylsiloxy)silane.

By the addition of the curing catalysts (G), the formation of coating films is accelerated and dry coating films can be obtained in a shorter time. The curing catalysts (G) may be used in an amount of not more than 10 wt %, and preferably not more than 1 wt % in the antifouling coating composition which may include a solvent. In the case where the catalysts are used, the lower limit of the amount thereof is preferably .1 wt %, and more preferably 0.01 wt %.

(H) Silane Coupling Agents

Preferred silane coupling agents (H) are those silane coupling agents having one, or two or more groups such as alkoxysilyl group, amino group, imino group, epoxy group, hydrosilyl group, mercapto group, isocyanate group and (meth)acryl group. In particular, those having an amino group are preferable. Examples of the silane coupling agents having an amino group include 3-(2-aminoethyl)aminopropyltrimethoxysilane, 3-aminopropyltrimethoxysilane, 3-aminopropyltriethoxysilane and 3-(2-(2-aminoethyl)aminoethyl)aminopropyltrimethoxysilane. Examples of other silane coupling agents include 3-glycidoxypropylmethyldimethoxysilane, vinyltrimethoxysilane, vinyltriethoxysilane, 3-mercaptopropyltrimethoxysilane, N-phenylpropyltrimethoxysilane and N-phenylpropyltriethoxysilane. Mixtures of the above silane coupling agents may also be used.

The addition of the silane coupling agents (H) can further increase the adhesion of the coating films with respect to primer coating films or substrates, or can increase the strength of the antifouling coating films. The amount of the silane coupling agents (H) added is preferably 0.01 to 1 wt % in the antifouling coating composition which may include a solvent.

(I) Antifouling Agents other than Pyrithione Metal Salts (C)

The antifouling agents (I) may be any of inorganic and organic antifouling agents other than the pyrithione metal salts (C). Known inorganic antifouling agents may be used, with copper, cuprous oxide, copper thiocyanate and inorganic copper compounds being preferable. Examples of the organic antifouling agents include tetramethylthiuram disulfide, carbamate compounds (e.g., zinc dimethyldithiocarbamate and manganese 2-ethylenebisdithiocarbamate) and 2,4,5,6-tetrachloroisophthalonitrile. The antifouling agents (I) may be used singly, or a plurality of antifouling agents may be used as a mixture.

The addition of the antifouling agents (I) can further enhance the antifouling properties of the coating films in seawater. The amount of the antifouling agents (I) added is preferably 0.1 to 30 wt % in the antifouling coating composition which may include a solvent.

(J) Additional Coating Film-forming Components

Additional coating film-forming components (J) other than the components such as the diorganopolysiloxanes (A) may be used while still achieving the objects of the invention. Examples of such "additional coating film-forming components" include resins which are hardly soluble or are insoluble in water such as acrylic resins, acryl silicone resins, unsaturated polyester resins, fluororesins, polybutene resins, silicone rubbers, urethane resins (rubbers), polyamide resins, vinyl chloride copolymer resins, chlorinated rubbers (resins), chlorinated olefin resins, styrene-butadiene copolymer resins, ethylene-vinyl acetate copolymer resins, vinyl chloride resins, alkyd resins, coumarone resins, trialkylsilyl acrylate (co)polymers (silyl resins) and petroleum resins.

The addition of the additional coating film-forming components (J) can increase the strength of the coating films. The amount of the additional coating film-forming components (J) added is preferably 0.1 to 30 wt % in the antifouling coating composition which may include a solvent.

(K) Inorganic Dehydrating Agents

Examples of the inorganic dehydrating agents (K) include anhydrous calcium sulfate ($CaSO_4$), synthetic zeolite adsorbents (available under trade names such as Molecular Sieves) and silicates, with anhydrous calcium sulfate and Molecular Sieves being preferable. One, or two or more inorganic dehydrating agents may be used.

The inorganic dehydrating agents (K) also function as stabilizers. Thus, the addition of these components prevents the occurrence of degradation by water in the antifouling coating composition and can further improve the storage stability. The amount of the inorganic dehydrating agents (K) added is preferably 0.1 to 10 wt % in the antifouling coating composition which may include a solvent.

(L) Flame Retardants

Exemplary flame retardants include antimony oxide and paraffin oxide.

(M) Thixotropic Agents

Exemplary thixotropic agents include polyethylene glycol, polypropylene glycol and derivatives thereof.

(N) Thermal Conductivity Improvers

Exemplary thermal conductivity improvers include boron nitride and aluminum oxide.

(Multiple-component Antifouling Coating Compositions/Kits for Preparation of Antifouling Coating Compositions)

The antifouling coating composition according to the invention is usually provided as a multiple-component coating including two or more components. Each of these components (liquids) comprises one or more ingredients, and is placed in respective packages and thereafter stored in a container such as a can. At the time of application, the contents of those components are mixed and stirred together to give an antifouling coating composition. That is, one aspect of the invention provides a kit for the preparation of the inventive antifouling coating composition that includes the aforementioned components.

In organopolysiloxane antifouling coating compositions, it is generally accepted that the "main agent" is a component which includes an organopolysiloxane as a base of binder resin for the antifouling coating composition, and the "curing agent" is a component which includes a compound capable of reacting with the organopolysiloxane to form crosslinks, and further that the "additive" is a component which includes compounds capable of reacting with the compounds present in both the main agent component and the curing agent component, such as silane coupling agents.

The antifouling coating composition of the invention (the kit for the preparation of the composition) may be produced in the form of a two-component system consisting of a main agent component (X) and a curing agent component (Y).

In the case where, for example, the silane coupling agent (H) is used as an optional component, the inventive antifouling coating composition (the kit for the preparation of the composition) may be produced in the form of a three-component system consisting of a main agent component (X), a curing agent component (Y) and an additive component (Z).

The main agent component (X) in the invention includes the diorganopolysiloxane (A) having at least two Si—OH (silanol) groups in the molecule, the pyrithione metal salt (C) and optionally other ingredients. As mentioned hereinabove, part or the whole of the diorganopolysiloxane (A) used in the main agent component (X) may be a heat treated product of the compound with silica. Examples of the optional ingredients which may be present in the main agent component (X) include the silicone oils (D) represented by phenyl-modified organopolysiloxanes, the anti-sagging and anti-settling agents (F) represented by ether-modified organopolysiloxanes, the fillers (E) represented by pigments, the antifouling agents (I) other than the pyrithione metal salts (C), the additional coating film-forming components (J), the inorganic dehydrating agents (K), the flame retardants (L), the thixotropic agents (M) and the thermal conductivity improvers (N).

The main agent component (X) may contain a solvent as required. Known solvents may be used, with examples including aliphatic solvents, aromatic solvents, ketone solvents, ester solvents, ether solvents and alcohol solvents. Examples of the aromatic solvents include xylene and toluene. Examples of the ketone solvents include methyl isobutyl ketone (MIBK) and cyclohexanone. Examples of the ether solvents include propylene glycol monomethyl ether and propylene glycol monomethyl ether acetate (PG-MAC). Examples of the alcohol solvents include isopropyl alcohol.

In order for the obtainable antifouling coating composition to exhibit a viscosity suited for application or other operations, the solvents are preferably used in, for example, 0 to 50 wt % relative to the antifouling coating composition. The solvents maybe added in appropriate amounts also to the curing agent component (Y) and the additive component (Z).

The curing agent component (Y) in the invention includes the organosilane and/or the partial hydrolyzate condensate thereof (B) having at least two hydrolyzable groups in the molecule and optional ingredients having high reactivity with the components in the main agent. Examples of the optional ingredients which may be present in the curing agent component (Y) include the curing catalyst (G), the silicone oils (D) represented by phenyl-modified organopolysiloxanes, and the anti-sagging and anti-settling agents (F) represented by ether-modified organopolysiloxanes. The silicone oils (D) represented by phenyl-modified organopolysiloxanes, and the anti-sagging and anti-settling agents (F) represented by ether-modified organopolysiloxanes may be added to any of the main agent component (X) and the curing agent component (Y) as long as the addition of such ingredients does not induce undesired reactions with other ingredients present in the components (X) and (Y).

The additive component (Z) in the invention includes optional ingredients having high reactivity with the ingredients in the main agent component (X) and the curing agent component (Y). Examples of the optional ingredients include the silane coupling agents (H).

For example, the antifouling coating composition of the invention may be obtained by adding the ingredients for constituting the multiple-component antifouling coating, namely, the contents of the components (packages) of the aforementioned kit and further optional ingredients as required sequentially or simultaneously and mixing these ingredients together in accordance with common procedures.

—Antifouling Substrates—

A method for manufacturing antifouling substrates according to the present invention includes a step of coating or impregnating a substrate with the aforementioned inventive antifouling coating composition, and a step of curing the composition that has been applied to coat or impregnate the substrate.

In detail, after sufficient stirring, the resultant antifouling coating composition is applied to a substrate by spraying or another method to coat or impregnate the substrate and is cured by being allowed to stand in air at room temperature for about 0.5 to 3 days or by being subjected to air blowing at an elevated temperature, thereby producing an antifouling substrate having an antifouling coating film on the surface. The film thickness of the cured antifouling coating film may be controlled to a desired thickness in accordance with factors such as purposes of use. Antifouling coating films having excellent antifouling performance may be obtained by applying the antifouling coating composition one to several times usually in a thickness of 30 to 400 µm, and preferably 30 to 200 µm per application, for example, 30 to 150 µm per application, and thereafter curing the composition so as to achieve a cured film thickness of, for example, 150 to 1000 µm.

In a wide range of industrial fields such as power generation, port and civil engineering construction and marine vessels (building and repairing), the antifouling coating compositions of the invention may be used to protect the surface of substrates to be placed in contact with seawater or fresh water from the attachment of marine organisms and thereby to allow the substrates to maintain their normal functions for long periods. Examples of such substrates include marine vessels (such as marine vessel shells), fishery materials (such as ropes, fishing nets, fishing gears, floats and buoys), underwater structures such as water supply inlets and drains in thermal power plants and nuclear power plants, seawater equipment (such as seawater pumps), mega-floats, coast roads, submarine tunnels, port facilities, and sludge diffusion prevention films in various offshore construction works for building structures such as canals and waterways.

The inventive antifouling coating compositions have an excellent balance between low viscosity and high thixotropy, and thus exhibit good application workability and can at the same time form relatively thick coating films even in one coating operation. Because of these characteristics, the inventive antifouling coating compositions can form coating films having excellent properties such as coating film strength and surface smoothness.

Applying the antifouling coating composition one time or several times as required and curing the composition according to common procedures result in antifouling substrates such as marine vessels and underwater structures coated with the antifouling coating films which exhibit excellent antifouling properties and have appropriate plasticity even when formed in a large thickness so as to display excellent crack resistance. A wide range of known application means may be used for the application of the antifouling coating composition, with examples including brushes, rolls, sprays and dip coaters. The organopolysiloxane antifouling coating compositions of the invention have characteristics suited for spray coating.

In common with antifouling coating films from usual organopolysiloxanes, the antifouling coating films formed from the inventive antifouling coating compositions have low surface free energy and can therefore suppress the attachment of various aquatic organisms. Even if such organisms have become attached, they are easily detached by the resistance of the flow of seawater or fresh water. In addition, the antifouling coating films formed from the inventive antifouling coating compositions can release the antifouling agents such as the pyrithione metal salts (C) persistently over long periods. Because the surface of the inventive antifouling substrates is coated with such antifouling coating films, excellent antifouling effects can be achieved continuously for long terms not only against the attachment of aquatic organisms such as sea lettuce, barnacles, green algae, serpula, oysters and *Bugula neritina* (for example, Schizoporellidae) but also against the fouling by slime. Further, these antifouling substrates have little impacts on the environment.

The antifouling coating compositions of the invention may be applied directly to substrates to coat or impregnate the substrates. Even in the case where the antifouling coating compositions prepared according to the invention are applied directly to substrates such as water supply inlets and drains in nuclear power plants, mega-floats and marine vessels made of such materials as fiber-reinforced plastics (FRP), steel, iron, wood and aluminum alloys, the compositions can exhibit good adhesion with respect to the surface of these substrates (bases).

Further, the antifouling coating compositions of the invention may be applied to already coated substrates. That is, the inventive antifouling coating compositions may be applied to the surface of substrates such as marine vessels and underwater structures preliminarily coated with base films (primer films) of coatings such as antirust agents and primers. Furthermore, the antifouling coating compositions of the invention may be applied as overcoatings to repair the surface of substrates such as marine vessels, in particular FRP boats, and underwater structures which have been already coated with conventional antifouling coatings or with the inventive antifouling coating compositions. The antifouling coating compositions of the invention may be placed in direct contact with any types of underlying coating films without limitation. Similarly to general organopolysiloxane antifouling coatings, for example, the inventive antifouling coating compositions may be applied to coating films formed from coatings based on resins such as epoxy resins, urethane resins and silicone resins. The antifouling coating compositions according to the present invention can be prepared to exhibit good adhesion with respect to the surface of these coating films.

—Methods for Improving Storage Stability of Antifouling Coating Compositions—

A method for improving the storage stability of an antifouling coating composition according to the present invention will be discussed. Here, the antifouling coating composition is in the form of a kit for the preparation of the antifouling coating composition, the set being a multiple-component system including respective packages of a component including a diorganopolysiloxane (A) having at least two silanol groups in the molecule, and a component including an organosilane and/or a partial hydrolyzate condensate thereof (B) having at least two hydrolyzable groups in the molecule. The method is characterized in that a pyrithione metal salt (C) is added to the component including the diorganopolysiloxane (A).

In this method, the pyrithione metal salt (C) functions as an effective ingredient for improving the storage stability of the antifouling coating composition. It is needless to mention that, in this case too, the pyrithione metal salt (C) naturally functions as an effective ingredient for preventing the attachment of organisms such as slime, namely, as an inherent antifouling agent.

The phrase that the storage stability is improved indicates that changes are suppressed from occurring during storage in terms of the properties of the antifouling coating composition, in particular, the diorganopolysiloxane (A) present in the main agent component (X) in the multiple-component kit for the preparation of the antifouling coating composition. For example, specific effects are obtained such as that the antifouling coating composition is prepared by mixing the contents of the multiple-component kit without an increase in viscosity and the obtained composition maintains appropriate viscosity and good workability such as sprayability, as well as that a decrease in sagging resistance is suppressed and the composition maintains thick applicability by exhibiting good sagging resistance. As mentioned hereinabove, these effects are probably associated with the interaction between the pyrithione metal salt (C) with the terminal hydroxyl groups of the diorganopolysiloxane (A).

Details regarding the ingredients present in the antifouling coating composition to be improved in terms of storage stability by the inventive method are similar to those described hereinabove. The same applies to the components constituting the kit for the preparation of the antifouling coating composition.

EXAMPLES

The present invention will be described in greater detail by presenting examples hereinbelow. The invention is not limited to the examples described below and may be modified without departing from the scope and spirit of the invention.

(Preparation of Antifouling Coating Compositions)

Table 1 describes information such as generic names, manufacturers and trade names of ingredients for antifouling coating compositions used in examples. In Table 1, the weight average molecular weight Mw was measured by gel permeation chromatography (GPC) using a calibration curve prepared with respect to standard polystyrenes.

TABLE 1

| Packs | Components | Generic names, chemical formulae, etc. |
|---|---|---|
| Main agent component (X) | Organopolysiloxane 1 | HO—[Si(CH$_3$)$_2$—O—]$_n$—H Mw 28,500 |
| | Organopolysiloxane 2 | HO—[Si(CH$_3$)$_2$—O—]$_n$—H Mw 31,000 |
| | Silica | Silica surface-treated with hexamethyldisilazane |
| | Red pigment | Red iron oxide |
| | White pigment | Titanium oxide |
| | Zinc pyrithione | Zn(—S—C$_5$H$_4$N—O—)$_2$ |
| | Copper pyrithione | Cu(—S—C$_5$H$_4$N—O—)$_2$ |
| | Irgarol | 2-methylthio-4-t-butylamino-6-cyclopropylamino-triazine |
| | Xylene | Xylene |
| Curing agent component (Y) | Partially hydrolyzed and condensed organosilane | H$_5$C$_2$O—[Si(OC$_2$H$_5$)$_2$—O—]$_n$—C$_2$H$_5$ |
| | Phenyl-modified organopolysiloxane | H$_3$C—[Si(CH$_3$)$_2$—O—]$_n$—[Si(C$_6$H$_5$)$_2$—O—]$_m$—CH$_3$ Phenyl modification rate 5%, 1,000 mPa·s |
| | Ether-modified organopolysiloxane 1 | H$_3$C—[Si(CH$_3$)$_2$—O—]$_n$—[Si(CH$_3$)(—R—(—C$_2$H$_4$—O—)$_1$—H)—]$_m$—CH 900 mPa·s |
| | Ether-modified organopolysiloxane 2 | H$_3$C—[Si(CH$_3$)$_2$—O—]$_n$—[Si(CH$_3$)((—C$_2$H$_4$—O—)$_1$—(—C$_3$H$_6$—O—)$_o$—R)—]$_m$—CH$_3$ 1700 mPa·s |
| | Ether-modified organopolysiloxane 3 | HO—(—C$_2$H$_4$—O—)$_1$—C$_3$H$_6$—[Si(CH$_3$)$_2$—O—]$_m$—Si(CH$_3$)$_2$—C$_3$H$_6$—(—O—C$_2$H$_4$—)$_n$—OH 270 mPa·s |
| | Tin catalyst | Dibutyltin dilaurate |
| | Acetylacetone | Acetylacetone |
| | Xylene | Xylene |
| Additive component (Z) | Aminosilane compound | (CH$_3$O)$_3$—Si—C$_3$H$_6$—NH—C$_2$H$_4$—NH$_2$ |
| | Xylene | Xylene |

| Packs | Components | Manufacturers | Trade names |
|---|---|---|---|
| Main agent component (X) | Organopolysiloxane 1 | | |
| | Organopolysiloxane 2 | | |
| | Silica | | |
| | Red pigment | TODA KOGYO CORP. | KN-V |
| | White pigment | SAKAI CHEMICAL INDUSTRY CO., LTD. | TITONE R-5N |
| | Zinc pyrithione | Arch Chemicals Japan, Inc. | Zinc Omadine Powder |
| | Copper pyrithione | Arch Chemicals Japan, Inc. | Copper Omadine Powder |
| | Irgarol | BASF Japan | Irgarol 1051 |
| | Xylene | | |
| Curing agent component (Y) | Partially hydrolyzed and condensed organosilane | Wacker Asahikasei Silicone Co., Ltd. | TES40 WN |
| | Phenyl-modified organopolysiloxane | | |
| | Ether-modified organopolysiloxane 1 | | |
| | Ether-modified | | |

TABLE 1-continued

|  |  |  |  |  |
|---|---|---|---|---|
|  | organopolysiloxane 2 |  |  |  |
|  | Ether-modified |  |  |  |
|  | organopolysiloxane 3 |  |  |  |
|  | Tin catalyst | DIC Corporation |  | Gleck TL |
|  | Acetylacetone |  |  |  |
|  | Xylene |  |  |  |
| Additive component (Z) | Aminosilane compound | Shin-Etsu Chemical Co., Ltd. |  | KBM-603 |
|  | Xylene |  |  |  |

Main agent components (X), curing agent components (Y) and additive components (Z) in amounts described in Table 2 were thoroughly mixed together homogeneously with a disperser. Thus, antifouling coating compositions of Examples 1 to 11 and Comparative Examples 1 to 4 were prepared.

[Evaluation Methods]

With regard to each of the antifouling coating compositions of Examples 1 to 11 and Comparative Examples 1 to 4 as prepared above and the antifouling coating films formed therefrom, property tests and antifouling tests described below were carried out. The results are described in Table 2.

<Coating/Coating Film Property Tests>

(Viscosity)

To determine the viscosity, each of the compositions was analyzed at 23° C. with a Stormer viscometer (manufacturer: TAIYU KIZAI CO., LTD., product name: Stormer Viscometer, model: 691).

(Sagging Resistance)

To evaluate sagging resistance, each of the compositions was applied to a tin plate on a flat table using a box-type sag tester illustrated in JIS K 5400 (1990) 6.4. Immediately after the film thickness was measured with a wet film gauge, the test plate (the tin plate) was held vertical so that the track of the sag tester became horizontal. The sagging resistance of the film was thus examined. The critical film thickness prior to the occurrence of sagging was determined with respect to each composition based on the criteria in which the sagging resistance was evaluated to be acceptable when the length of the sample which had sagged from a coating layer toward a downward adjacent coating layer was less than half the space between the coating layers.

(Adhesion)

Sandblasted plates were provided which had been coated with an epoxy-based anticorrosive coating (trade name: BANNOH 500, manufactured by CHUGOKU MARINE PAINTS, LTD.) in a thickness of 100 μm and further with a polyurethane binder coating (trade name: CMP BIOCLEAN SG, manufactured by CHUGOKU MARINE PAINTS, LTD.) in a thickness of 100 μm. To the coated plates, each of the compositions was applied such that the dry film thickness would be 200 μm. The compositions were dried at room temperature for one day. Thereafter, a straight incision was cut with a knife to a depth reaching the CMP BIOCLEAN SG coating film layer and the top surface was strongly rubbed in the direction perpendicular to the incision, thereby evaluating the adhesion. If the adhesion is low, rubbing causes a separation between the composition layer and the CMP BIOCLEAN SG coating film layer.

(Storage Stability)

After the main agent components (X) were prepared, they were subjected to an accelerated test in which the components were stored at 40° C. for 50 days and were thereafter tested to determine the above properties, thereby evaluating the storage stability of the coatings.

<Antifouling Tests>

(Preparation of Test Plates)

Sandblasted plates were provided which had been coated with an epoxy-based anticorrosive coating (trade name: BANNOH 500, manufactured by CHUGOKU MARINE PAINTS, LTD.) in a thickness of 100 μm and further with a polyurethane binder coating (trade name: CMP BIOCLEAN SG, manufactured by CHUGOKU MARINE PAINTS, LTD.) in a thickness of 100 μm. To the coated plates, each of the compositions of Examples 1 to 11 and Comparative Examples 1 to 4 was applied such that the dry film thickness would be 200 μm.

(Method of Testing Static Antifouling Properties)

After the test plates were dried at room temperature for 7 days, they were immersed in seawater in Miyajima Bay, Hiroshima, Japan, under static conditions. The proportions of the areas fouled by organisms on the surface of the test plates were evaluated by visual observation every three months.

(Method of Testing Dynamic Antifouling Properties)

After the test plates were dried at room temperature for 7 days, they were immersed off the coast in Kure, Hiroshima, Japan, while generating a stream of water with rotors such that the speed was approximately 15 knots. The proportions of the areas fouled by organisms on the surface of the test plates were evaluated by visual observation every three months.

(Evaluation Points)

0: No aquatic organisms had become attached.

0.5: Aquatic organisms had become attached to more than 0% and not more than 10% of the surface.

1: Aquatic organisms had become attached to more than 10% and not more than 20% of the surface.

2: Aquatic organisms had become attached to more than 20% and not more than 30% of the surface.

3: Aquatic organisms had become attached to more than 30% and not more than 40% of the surface.

4: Aquatic organisms had become attached to more than 40% and not more than 50% of the surface.

5: Aquatic organisms had become attached to from more than 50% to about 100% of the surface.

TABLE 2

|  |  | Packs | Generic names, chemical formulae, etc. | Ex. 1 | Ex. 2 | Ex. 3 | Ex. 4 | Ex. 5 |
|---|---|---|---|---|---|---|---|---|
| Compositions | Main agent component (X) | Organopolysiloxane 1 and silica | 59.8 | 59.8 | 56.8 | 56.1 | 50.6 |
|  |  |  | Organopolysiloxane 2 and silica |  |  |  |  |  |

TABLE 2-continued

|  |  |  |  |  |  |  |  |
|---|---|---|---|---|---|---|---|
|  |  | Red pigment |  |  | 5.5 | 5.4 | 5.1 |
|  |  | White pigment | 4.0 | 4.0 |  |  |  |
|  |  | Zinc pyrithione | 5.0 |  | 5.5 | 7.2 | 10.1 |
|  |  | Copper pyrithione |  | 5.0 |  |  |  |
|  |  | Irgarol |  |  |  |  |  |
|  |  | Xylene | 9.2 | 12.2 | 15.8 | 13.4 | 20.7 |
|  |  | Subtotal | 77.9 | 80.9 | 83.6 | 82.2 | 86.5 |
|  | Curing agent component (Y) | Partially hydrolyzed and condensed organosilane | 3.0 | 3.0 | 2.9 | 2.8 | 2.5 |
|  |  | Phenyl-modified organopolysiloxane | 5.0 | 5.0 | 4.8 | 4.7 | 4.2 |
|  |  | Ether-modified organopolysiloxane 1 | 0.1 | 0.1 | 0.1 | 0.1 | 0.1 |
|  |  | Ether-modified organopolysiloxane 2 |  |  |  |  |  |
|  |  | Ether-modified organopolysiloxane 3 |  |  |  |  |  |
|  |  | Tin catalyst | 0.6 | 0.6 | 0.6 | 0.6 | 0.4 |
|  |  | Acetylacetone | 5.0 | 5.0 | 4.8 | 4.7 | 4.2 |
|  |  | Xylene | 2.3 | 2.3 | 2.3 | 2.2 | 1.2 |
|  |  | Subtotal | 16.0 | 16.0 | 15.5 | 15.1 | 12.6 |
|  | Additive component (Z) | Aminosilane compound | 0.1 | 0.1 | 0.1 | 0.1 | 0.1 |
|  |  | Xylene | 2.9 | 2.9 | 0.8 | 2.7 | 0.8 |
|  |  | Subtotal | 3.0 | 3.0 | 0.9 | 2.8 | 0.9 |
|  |  | Total | 96.9 | 99.9 | 100.0 | 100.0 | 100.0 |
| Properties of coatings | Immediately after fabrication | Sagging resistance Critical wet film thickness prior to occurrence of sagging [μm] | 300 | 350 | 200 | 200 | 350 |
|  |  | Stormer viscosity [KU] | 82 | 82 | 75 | 75 | 70 |
|  | After accelerated stability test at 40° C. for 50 days | Sagging resistance Critical wet film thickness prior to occurrence of sagging [μm] | 300 | 350 | 200 | 250 | 350 |
|  |  | Stormer viscosity [KU] | 82 | 82 | 72 | 73 | 72 |
|  |  | Adhesion | Good | Good | Good | Good | Good |
| Antifouling properties | Static immersion | 3 months | 0 | 0.5 | 0 | 0 | 0 |
|  |  | 6 months | 2 | 2 | 2 | 2 | 2 |
|  |  | 9 months | 0.5 | 1 | 0.5 | 0.5 | 0.5 |
|  |  | 12 months | 0.5 | 0 | 0.5 | 0.5 | 0.5 |
|  | Dynamic immersion | 3 months | 0 | 0 | 0 | 0 | 0 |
|  |  | 6 months | 0 | 0.5 | 0 | 0 | 0 |
|  |  | 9 months | 0 | 0.5 | 0 | 0 | 0 |
|  |  | 12 months | 0 | 0.5 | 1 | 1 | 1 |

|  | Packs | Generic names, chemical formulae, etc. | Ex. 6 | Ex. 7 | Ex. 8 | Ex. 9 | Ex. 10 |
|---|---|---|---|---|---|---|---|
| Compositions | Main agent component (X) | Organopolysiloxane 1 and silica | 32.8 |  | 58.2 | 43.1 | 54.2 |
|  |  | Organopolysiloxane 2 and silica |  | 51.8 |  |  |  |
|  |  | Red pigment | 5.5 | 5.2 | 5.6 | 7.2 | 5.4 |
|  |  | White pigment |  |  |  |  |  |
|  |  | Zinc pyrithione | 18.2 | 4.3 |  |  | 4.5 |
|  |  | Copper pyrithione |  |  | 3.7 | 6.0 |  |
|  |  | Irgarol |  |  |  |  |  |
|  |  | Xylene | 28.7 | 25.4 | 13.9 | 24.5 | 19.8 |
|  |  | Subtotal | 85.2 | 86.7 | 81.5 | 80.8 | 83.9 |
|  | Curing agent component (Y) | Partially hydrolyzed and condensed organosilane | 2.7 | 2.6 | 2.9 | 3.6 | 2.7 |
|  |  | Phenyl-modified organopolysiloxane | 4.6 | 4.3 | 4.9 | 6.0 | 4.5 |
|  |  | Ether-modified organopolysiloxane 1 | 0.1 | 0.1 | 0.1 | 0.1 |  |
|  |  | Ether-modified organopolysiloxane 2 |  |  |  |  | 2.1 |
|  |  | Ether-modified organopolysiloxane 3 |  |  |  |  |  |

TABLE 2-continued

| | | | | | | | |
|---|---|---|---|---|---|---|---|
| | | Tin catalyst | 0.5 | 0.4 | 0.6 | 0.6 | 0.5 |
| | | Acetylacetone | 4.6 | 4.3 | 4.9 | 6.0 | 4.5 |
| | | Xylene | 1.3 | 0.7 | 2.2 | 1.7 | 0.9 |
| | | Subtotal | 13.8 | 12.4 | 15.5 | 18.0 | 15.2 |
| | Additive component (Z) | Aminosilane compound | 0.1 | 0.1 | 0.1 | 0.1 | 0.1 |
| | | Xylene | 0.8 | 0.8 | 2.8 | 1.1 | 0.8 |
| | | Subtotal | 0.9 | 0.9 | 2.9 | 1.2 | 0.9 |
| | | Total | 99.9 | 100.0 | 99.9 | 100.0 | 100.0 |
| Properties of coatings | Immediately after fabrication | Sagging resistance Critical wet film thickness prior to occurrence of sagging [μm] | 250 | 250 | 200 | 300 | 250 |
| | | Stormer viscosity [KU] | 69 | 72 | 75 | 72 | 75 |
| | After accelerated stability test at 40° C. for 50 days | Sagging resistance Critical wet film thickness prior to occurrence of sagging [μm] | 300 | 350 | 200 | 350 | 250 |
| | | Stormer viscosity [KU] | 72 | 76 | 73 | 70 | 73 |
| | | Adhesion | Good | Good | Good | Good | Good |
| Antifouling properties | Static immersion | 3 months | 0 | 0 | 0 | 0 | 0 |
| | | 6 months | 3 | 2 | 3 | 2 | 2 |
| | | 9 months | 1 | 0.5 | 1 | 0.5 | 0.5 |
| | | 12 months | 0 | 0.5 | 0.5 | 0.5 | 0.5 |
| | Dynamic immersion | 3 months | 0 | 0 | 0 | 0 | 0 |
| | | 6 months | 1 | 0 | 0 | 0 | 0 |
| | | 9 months | 1 | 0 | 0 | 0 | 0 |
| | | 12 months | 0.5 | 1 | 1 | 1 | 1 |

| | Packs | Generic names, chemical formulae, etc. | Ex. 11 | Comp. Ex. 1 | Comp. Ex. 2 | Comp. Ex. 3 | Comp. Ex. 4 |
|---|---|---|---|---|---|---|---|
| Compositions | Main agent component (X) | Organopolysiloxane 1 and silica | 52.3 | 59.8 | 59.8 | 60.5 | |
| | | Organopolysiloxane 2 and silica | | | | | 55.8 |
| | | Red pigment | 5.2 | | | 7.8 | 5.6 |
| | | White pigment | | 7.7 | 4.0 | | |
| | | Zinc pyrithione | 4.4 | | | | |
| | | Copper pyrithione | | | | | |
| | | Irgarol | | | 5.0 | | |
| | | Xylene | 23.6 | 6.4 | 9.2 | 12.5 | 23.7 |
| | | Subtotal | 85.5 | 73.9 | 77.9 | 80.8 | 85.1 |
| | Curing agent component (Y) | Partially hydrolyzed and condensed organosilane | 2.6 | 3.0 | 3.0 | 3.0 | 2.8 |
| | | Phenyl-modified organopolysiloxane | 4.4 | 5.0 | 5.0 | 5.1 | 4.6 |
| | | Ether-modified organopolysiloxane 1 | | 0.1 | 0.1 | 0.1 | 0.1 |
| | | Ether-modified rganopolysiloxane 2 | | | | | |
| | | Ether-modified organopolysiloxane 3 | 0.9 | | | | |
| | | Tin catalyst | 0.4 | 0.6 | 0.6 | 0.6 | 0.5 |
| | | Acetylacetone | 4.4 | 5.0 | 5.0 | 5.1 | 4.6 |
| | | Xylene | 0.9 | 2.3 | 2.3 | 2.2 | 1.3 |
| | | Subtotal | 13.6 | 16.0 | 16.0 | 16.1 | 13.9 |
| | Additive component (Z) | Aminosilane compound | 0.1 | 0.1 | 0.1 | 0.1 | 0.1 |
| | | Xylene | 0.8 | 2.9 | 2.9 | 3.0 | 0.8 |
| | | Subtotal | 0.9 | 3.0 | 3.0 | 3.0 | 0.9 |
| | | Total | 100.0 | 92.9 | 96.9 | 99.9 | 99.9 |
| Properties of coatings | Immediately after fabrication | Sagging resistance Critical wet film thickness prior to occurrence of sagging [μm] | 250 | 300 | 200 | 200 | 300 |
| | | Stormer viscosity [KU] | 69 | 79 | 76 | 76 | 78 |
| | After accelerated stability test at 40° C. for 50 days | Sagging resistance Critical wet film thickness prior to occurrence of sagging [μm] | 350 | 200 | 400 | 100 | 200 |
| | | Stormer viscosity [KU] | 67 | 77 | >141 | 77 | 82 |
| | | Adhesion | Good | Good | Good | Good | Good |

TABLE 2-continued

| Antifouling properties | Static immersion | 3 months | 0 | 5 | 4 | 5 | 5 |
|---|---|---|---|---|---|---|---|
| | | 6 months | 1 | 5 | 5 | 5 | 5 |
| | | 9 months | 0.5 | 5 | 5 | 5 | 5 |
| | | 12 months | 0.5 | 4 | 5 | 4 | 4 |
| | Dynamic immersion | 3 months | 0 | 3 | 3 | 1 | 1 |
| | | 6 months | 0 | 5 | 5 | 5 | 5 |
| | | 9 months | 0 | 1 | 4 | 2 | 2 |
| | | 12 months | 0.5 | 5 | 5 | 5 | 5 |

The results show that the antifouling coating compositions of the invention satisfy sprayability and sagging resistance in a balanced manner and can maintain these properties stably even after long storage.

Further, the antifouling performance will be discussed with respect to the proportions of fouling by aquatic organisms including slime. As shown in Table 2, the coating films of Comparative Examples 1, 3 and 4 which did not contain any pyrithione metal salts and the coating film of Comparative Example 2 in which the pyrithione metal salt had been replaced by Irgarol suffered fouling at high proportions mainly due to the attachment of slime. In contrast, the coating films of Examples 1 to 11 which contained the pyrithione metal salt were demonstrated to exhibit high antifouling properties over long periods, permitting very little fouling. Further, this antifouling performance was displayed in both the static environment and the dynamic environment. These result shows that the inventive antifouling coating films can effectively exhibit antifouling performance under various conditions experienced by marine structures and marine vessels.

The invention claimed is:

1. An antifouling coating composition comprising:
(A) a diorganopolysiloxane having at least two silanol groups in the molecule,
(B) an organosilane and/or a partial hydrolyzate condensate thereof having at least two hydrolyzable groups in the molecule, and
(C) a pyrithione metal salt, wherein the content of said pyrithione metal salt in said antifouling coating composition ranges from 3 to 20 wt %, and
an ether-modified organopolysiloxane.

2. The antifouling coating composition according to claim 1, wherein the diorganopolysiloxane (A) is represented by General Formula [I]:

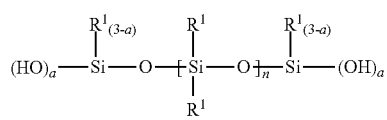

wherein $R^1$ indicates independently at each occurrence a hydrocarbon group of 1 to 6 carbon atoms, the letter a is an integer of 1 to 3, and the letter n is an integer of 5 to 1,000.

3. The antifouling coating composition according to claim 1, wherein the organosilane and/or the partial hydrolyzate condensate thereof (B) is represented by General Formula [II]:

wherein $R^2$ indicates independently at each occurrence a hydrocarbon group of 1 to 6 carbon atoms, Y indicates independently at each occurrence a hydrolyzable group, and the letter d is an integer of 0 to 2.

4. The antifouling coating composition according to claim 1, wherein the pyrithione metal salt (C) is represented by General Formula [III]:

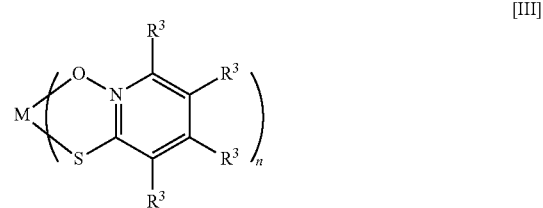

wherein $R^3$ indicates independently at each occurrence a hydrogen atom or an alkyl, cycloalkyl, alkenyl, aryl, alkoxy or halogenated alkyl group of 1 to 6 carbon atoms, M indicates a metal Zn, Cu, Na, Mg, Ca, Ba, Fe or Sr, and the letter n is the valence of the metal M.

5. The antifouling coating composition according to claim 1, wherein the diorganopolysiloxane (A) has a weight average molecular weight of 500 to 1,000,000.

6. The antifouling coating composition according to claim 1, further comprising silica wherein silica and part or the whole of the diorganopolysiloxane (A) have been heat treated prior to preparing said antifouling coating composition.

7. The antifouling coating composition according to claim 1, wherein the organosilane and/or the partial hydrolyzate condensate thereof (B) has at least one of oxime groups, acetyloxy groups and alkoxy groups as the hydrolyzable groups.

8. The antifouling coating composition according to claim 1, further comprising a curing catalyst (G).

9. A kit for the preparation of the antifouling coating composition according to claim 1, the kit being a multiple-component system comprising respective packages of a component comprising the diorganopolysiloxane (A) and the pyrithione metal salt (C), and a component comprising the organosilane and/or the partial hydrolyzate condensate thereof (B).

10. An antifouling coating film obtained by curing the antifouling coating composition according to claim 1.

11. An antifouling substrate obtained by coating or impregnating a substrate with the antifouling coating composition according to claim 1, and thereafter curing the composition.

12. The antifouling substrate according to claim 11, wherein the substrate is an underwater structure or a marine vessel.

13. A method for manufacturing an antifouling substrate, comprising coating or impregnating a substrate with the antifouling coating composition according to claim 1, and curing the composition that has been applied to coat or impregnate the substrate.

14. The kit according to claim 9, further comprising silica wherein silica in a package and part or the whole of the diorganopolysiloxane (A) have been heat treated prior to being placed in said respective packages.

15. The antifouling coating composition according to claim 1, further comprising a phenyl-modified organopolysiloxane.

16. The antifouling coating composition according to claim 1, wherein the content of the ether-modified organopolysiloxan ranges 0.1 to 3 wt % in terms of the content in a dry coating film formed from the antifouling coating composition.

* * * * *